United States Patent [19]

Hickinbotham

[11] Patent Number: 4,615,887

[45] Date of Patent: Oct. 7, 1986

[54] METHOD FOR PRODUCING WINE BY FALL CARBONIC MACERATION

[75] Inventor: Stephen J. Hickinbotham, Burwood, Australia

[73] Assignee: Hickinbotham Winemakers Pty. Ltd., Australia

[21] Appl. No.: 590,765

[22] Filed: Mar. 19, 1984

[30] Foreign Application Priority Data

| | | | |
|---|---|---|---|
| Mar. 23, 1983 | [AU] | Australia | PF8576 |
| Nov. 3, 1983 | [AU] | Australia | PG2192 |
| Dec. 9, 1983 | [AU] | Australia | PG2774 |
| Feb. 9, 1984 | [AU] | Australia | 24439/84 |

[51] Int. Cl.$^4$ .......................... C12G 1/00; C12G 1/02
[52] U.S. Cl. ............................ 426/8; 99/276; 426/15; 426/411
[58] Field of Search ............... 426/8, 15, 411, 312, 426/316, 324; 99/276, 277.1

[56] References Cited

U.S. PATENT DOCUMENTS

| | | | |
|---|---|---|---|
| 3,450,542 | 6/1969 | Badran | 426/316 X |
| 3,760,711 | 9/1973 | Webster | 99/277.1 |
| 3,900,571 | 8/1975 | Johnson | 426/15 |
| 4,238,511 | 12/1980 | Egretier | 426/15 |

OTHER PUBLICATIONS

Amerine, et al., The Technology of Wine Making, 3rd ed., The Av. Publ. Co., Westport, Conn. 1972, pp. 246–249 & 358–361.

Amerine, M. A. Wine Production Technology in the United States, American Chemical Society, Washington, D.C., 1981, pp. 70–71.

*Primary Examiner*—David M. Naff
*Attorney, Agent, or Firm*—Larson and Taylor

[57] ABSTRACT

Method and apparatus are disclosed for producing wine by full carbonic maceration in which whole uncrushed grapes are placed in a closable container to a depth that the grapes remain whole, the air within the container is expelled to produce a substantially anaerobic atmosphere in which the grapes undergo intra-cellular fermentation. The containers comprise sealable plastic bags that incorporate a one way valve to allow release but not entry of gases. The container preferably contains solid $CO_2$ to expel air by vaporization of the solid $CO_2$.

20 Claims, 5 Drawing Figures

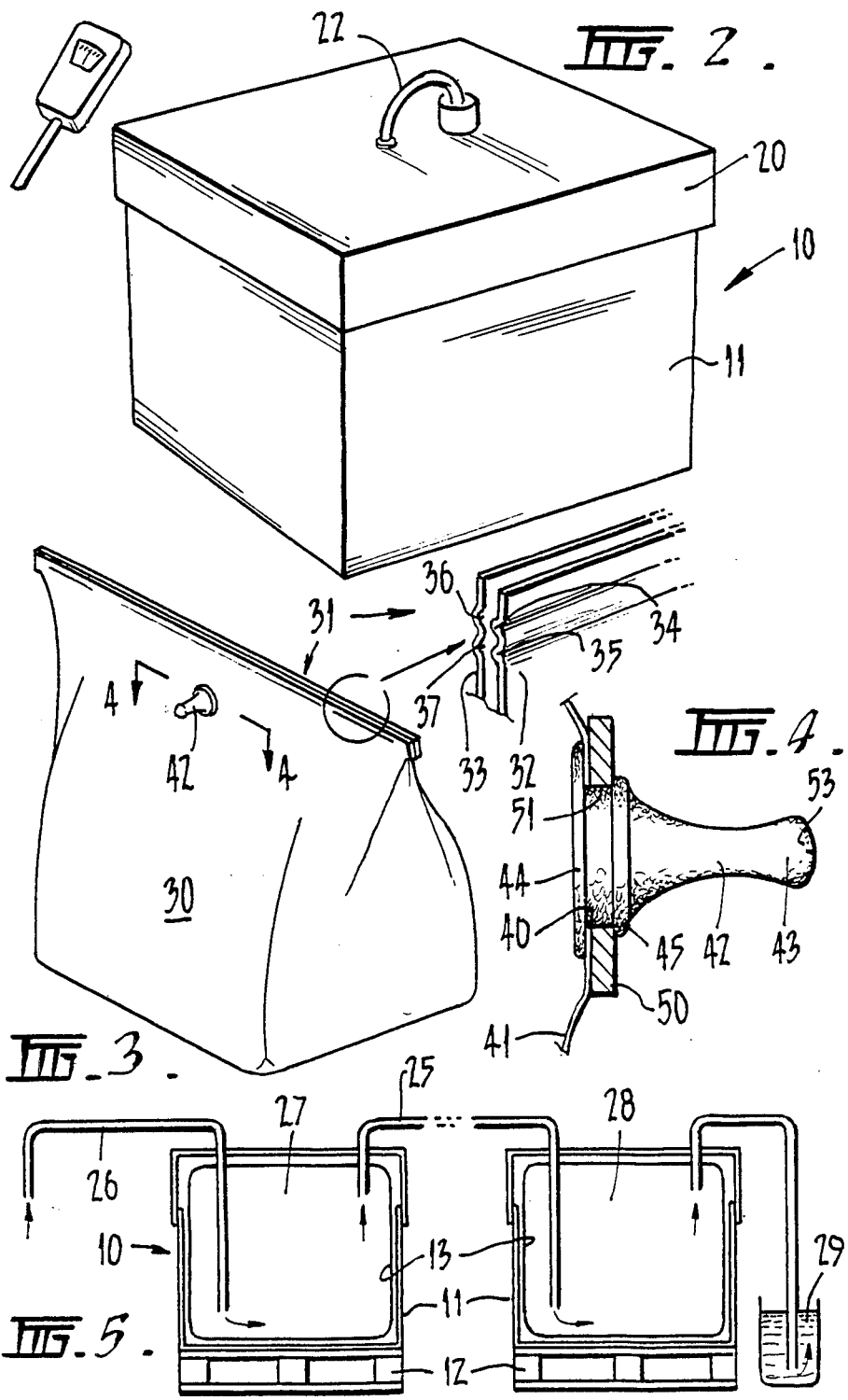

METHOD FOR PRODUCING WINE BY FALL CARBONIC MACERATION

This invention relates to a method of fermentation of grapes and apparatus for fermentation. In particular the invention relates to a method of producing wine by the process of carbonic maceration.

Carbonic maceration is defined as a process in which fermentation of the grapes occurs by intra-cellular fermentation only, that is the fermentation is generated by utilisation of the enzymes present within the grapes themselves. The term relates to fermentation techniques which do not involve crushing the grapes. Uncrushed bunches of grapes are placed in a closed container that is filled with carbon dioxide gas. Under these conditions, the entire berries undergo an intra-cellular or auto-fermentation. After a period of maceration and completion of fermentation the grapes are crushed and pressed. Fermentation by carbonic maceration is considered highly desirable by winemakers because the process produces natural aromatic qualities not usually produced by fermentation of crushed grapes. The fermentation process produced by the enzymes of the berries produces glycerine and certain other constituents, breaks down the malic acid and alters the physical appearance of the berries. Consequently this process softens the wine and produces a more complex flavour.

Although carbonic maceration processes have been used in winemaking for many years, these processes have not employed full carbonic maceration, as a proportion of the grapes are crushed through handling and under the weight of bunches of grapes piled one on top of the other in vats or containers and they are conveniently defined as "semi-carbonic maceration". The juice from the crushed grapes then undergoes a conventional yeast fermentation in contact with the uncrushed grapes which are simultaneously undergoing the carbonic maceration process.

In a typical conventional semi-carbonic maceration winemaking process, whole relatively undamaged bunches of grapes are tipped onto a conveyor belt and dropped into small and shallow fermenters (usually about 5000 L capacity and about 2 meters tall). The impact of the fall initiates a certain amount of juicing and the added weight of succeeding bunches contributes to juicing as well. The wild yeasts on the grapes cause conventional primary fermentation of the juice to commence, thereby liberating carbon dioxide. The carbon dioxide creates an anaerobic atmosphere under which carbonic maceration of the uncrushed grapes occurs. High levels of sulphur dioxide ($SO_2$) are usually added to prevent bacterial development. During this operation further grapes burst adding to the yeast fermenting juices. After about 8 to 15 days, this stage is complete, and at least 20% of the grapes will generally have burst or been crushed to release juice. Fermenting wine is then run off and the must and the remaining mass is pressed. The pressings and/or free run are blended once yeast fermentation and the malo-lactic transformation are complete. Sulphur dioxide is added and the wine is cold-stabilised then bottled. Hot bottling is generally practised to ensure complete sterility in a young wine.

Stalks, namely all matter but the berry, are a quality-limiting factor—they represent a production constraint. They preclude maximum skin/wine contact and therefore pick up of maximum colour and skin tannin. Presence of stalks also precludes hard pressing (especially in continuous presses). Therefore yield is lower than for other processes. Total $SO_2$ levels can be quite high in the finished wine since it is added at least twice—once when the fermenter is filled and once after completion of fermentation.

Furthermore, many small fermenters are required to minimise excessive juicing. Each small tank must be monitored and temperature-controlled, with increased labour requirements. Expensive fermenter tanks are occupied for long periods during the maceration stage.

With a large solid phase it is difficult to control the yeast strain. Apiculate yeast can readily develop in upper layers resulting in acetification.

Applicants seek to minimise or overcome at least some of the stated disadvantages of the conventional semi-carbonic maceration wine-making process by providing a method of carrying out full carbonic maceration.

For the purposes of this specification, full carbonic maceration is defined as a carbonic maceration process carried out in such a way that more than 85% of the grapes remain whole and uncrushed up to the time that the carbonic maceration is completed.

According to one aspect of the present invention there is provided a method of producing wine by full carbonic maceration including the steps of:

(a) placing whole grapes into a closable container,
(b) closing the containers to prevent entry of air,
(c) expelling the air within the container,
(d) maintaining a sufficiently low concentration of gaseous oxygen in the container for a time effective to complete substantial intra-cellular fermentation, the handling of the grapes, the depth of the grapes in the closable container and the conditions under which the full carbonic maceration is carried out being such as to ensure that more than 85% of the grapes remain whole up to the time that the full carbonic maceration steps (a) to (d) are completed.

Preferably, at least 90%, more preferably at least 95% of the grapes remain whole and uncrushed up to the time that the full carbonic maceration steps (a) to (d) are completed.

After these steps are completed some or all of the grapes may be destemmed and crushed and the must, being the crushed grapes without stalks, is fermented with yeast to produce the finished wine. In the case of some white grapes only the juice is fermented with yeast. Alternatively, the red or black grapes may simply be crushed, the juice separated and fermented then cleaned and bottled if a light Rose type of wine is required. In order to ensure that the lower layers of grapes placed in the closable containers are not crushed by the layers on top of them, the depth of grapes should be kept relatively low. Preferably, the depth of grapes is kept below 1.75 meters, more preferably below 1.25 meters. Shallow containers with a capacity of less than 2000 liters are particularly suitable.

The closable container may suitably comprise a rigid outer container which is lined with a flexible liquid impervious film in the form of a sack or bag. Preferably the closable container includes means, such as an integral pallet, to facilitate handling by fork-lift trucks. The rigid outer container may suitably be constructed in such a way that the sides may be collapsed to reduce storage space required during the period when the container is not in use.

An appropriate number of such closable containers may be provided at various locations around a vineyard, so that grape pickers can pick directly into them, thereby minimising squashing of grapes through handling.

Where a plastic bag is used as a liner, the bag may be closed by tying off the open end of the bag or by providing the bag with sealing means such as a tongue and groove snap-shut mechanism. A one-way valve may be provided on the bag to allow excess Carbon Dioxide ($CO_2$) generated by the full carbonic maceration reaction to be expelled.

Prior to the bag being filled with grapes solid $CO_2$ may be added to the bag so that $CO_2$ gas is gradually released to purge the bag of air. This $CO_2$ release should occur prior to the commencement of the full carbonic maceration reaction at which time the grapes themselves begin to give off $CO_2$. The time taken for the grapes to begin to give off $CO_2$ is usually in excess of 15 hours, and often 24 hours, depending upon the nature of the grapes themselves and the conditions under which they are being stored. The solid $CO_2$ should suitably be housed in an insulating container held within the bag to prevent damage, which could otherwise be caused by direct contact with the grapes and the bag walls and to slow down the rate at which the $CO_2$ is released as gas in order to ensure a continuous purging flow over an extended period. Generally the quantity of $CO_2$ used should exceed 2, and preferably $3\frac{1}{2}$ times the capacity of the sealable container.

The extent to which the full carbonic maceration reaction proceeds will depend on a number of physical factors, such as: temperature, sugar content within grapes and duration of reaction, and will also depend on the requirements of the winemaker who may wish to stop the reaction at any stage before completion. Generally, the full carbonic maceration reaction will result in from 1 to 7, or more preferably 1 to 3, degrees Baume of sugar being metabolised, mainly to alcohol.

Because the sugar content is decreased before the final yeast fermentation, heat generated in that stage is reduced with the result that there is less demand for refrigeration of the fermenting must or juice compared with conventional fermentation processes. Where 2 to 7 degrees Baume of sugar is metabolished in the full carbonic maceration stage, refrigeration can generally be dispensed with entirely.

Generally, it is possible under Australian climatic conditions to leave the closed containers holding picked grapes out in the open, providing they are shaded from the sun during the hottest part of the day, whilst the full carbonic maceration process proceeds. Upon completion of the full carbonic maceration, the grapes may be destemmed and crushed into must or juice (if separated from the skins and seeds) prior to being put into a fermentation vat which may be as large as the winemaker desires. This compares favourably with conventional carbonic maceration processes which require the use of a relatively large number of fermenting vats to carry out the process as fermentation proceeds at the same time as carbonic maceration. Thus the full carbonic maceration process requires only 1 large fermenting vat compared with a series of smaller vats with consequent savings in labour and cost of vat capacity.

In the full carbonic maceration stage, the fact that there is little or no juice present means that there is generally no need to use sulphur dioxide. Problems relating to bacterial growth are also avoided or minimised as there is effectively no substrate for such growth. Improved control over colour and tannin extraction can be achieved as the initial maceration does not extract must of these. Thus after destemming and crushing, the winemaker can choose the extent of extraction by varying the time and conditions under which he ferments the grapes on the skins.

The full carbonic maceration also has advantages in relation to botrytised grapes as it protects them from oxidation by reducing or eliminating contact of the juice with air.

Complexity of conventionally fermented wines can be improved by adding a proportion of full carbonic maceration juice or wine.

In an alternative aspect of the invention the full carbonic maceration can be carried out in a storeroom which has been purged of air. The grapes can be stacked in the storeroom in a number of open containers which are shallow enough to ensure that at least 90% of the grapes remain uncrushed right up to the end of the full carbonic maceration. Following full carbonic maceration, wine can be produced from the grapes in a conventional manner.

Various embodiments of the present invention will now be described by way of example only with reference of the accompanying drawings in which:

FIG. 2 is a perspective view of the container closed during fermentation.

FIG. 3 is a view of a suitable platics bag and one way valve,

FIG. 4 is a cross sectional view taken along lines 4—4 of FIG. 3, and

FIG. 5 illustrates an array of sealed containers in fluid interconnection.

Figure 1:
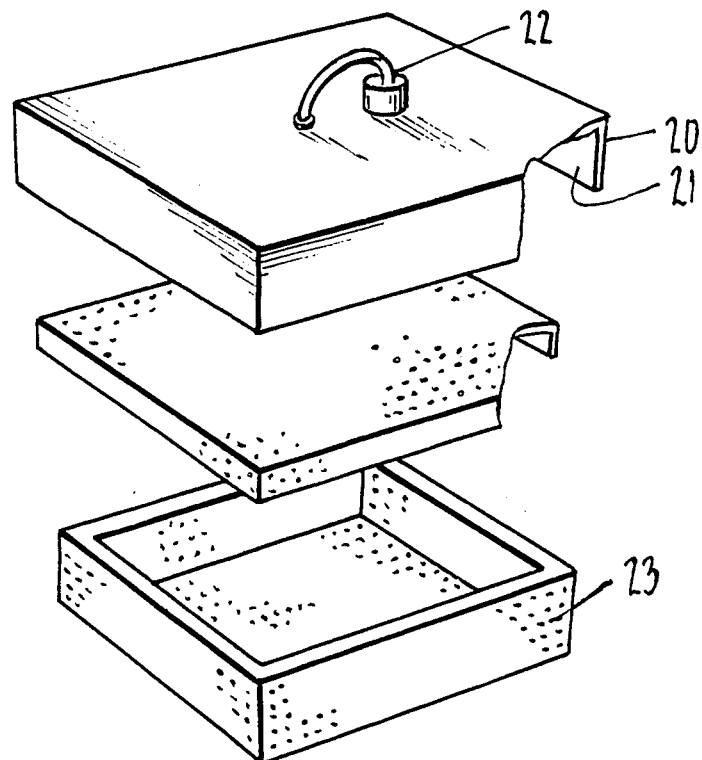
FIG. 1 is a perspective view of a suitably lined container for use in the process of carbonic maceration.
Figure 1:
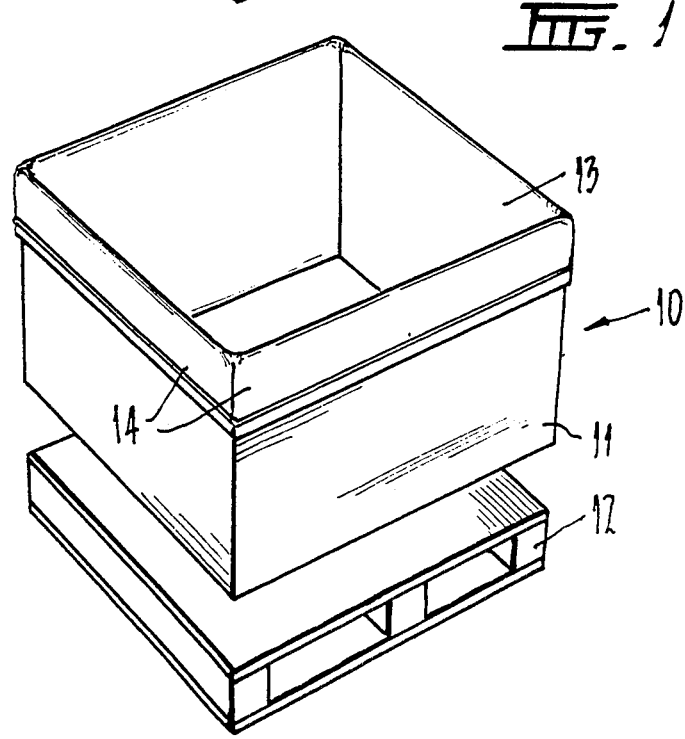

As illustrated in FIGS. 1 to 4 wine is made by the process of carbonic maceration by use of a plurality of containers 10 in the form of collapsible boxes 11 suitably constructed of thick walled cardboard that when assembled have the cross-section to fit on a standard pallet 12. The cardboard boxes are approximately 1 meter high and are lined with a heavy-duty plastic liner 13 such as polyethylene terephthalate. The edges 14 of the plastics liner overlap the cardboard box 11. The containers are transported on the pallets to the grapevines.

The process of carbonic maceration requires that fermentation of the grapes takes place in a substantially anaerobic atmosphere. Consequently once grapes have been placed in the container it becomes necessary to close the container and expel the air within. The container may be closed in many ways, for example, as shown in FIG. 1 by placing a lined lid 20 onto the top of the container 10 so that the lining 21 of the lid forms an airtight seal with the overlapping edges 14 of the liner 13. A suitable air-lock 22 is positioned in the top of the lid 20 to allow release of gases from within the container, but not entry.

The containers may be provided with gas inlet means to facilitate entry of a heavier-than-air gas, such as $CO_2$. Entry of sufficient $CO_2$ causes the air within the sealed enclosure to be forced out via the air-lock.

In FIG. 5, an arrangement of containers 10 on pallets 12 is shown where the containers are interconnected by pipes 25. The gas inlet 26 provides $CO_2$ to the first sealed container 27 which is exhausted via pipes 25 to the second sealed container 28. The second sealed container 28 is exhausted through an air-lock 29. It is understood that any number of such containers may be placed in an array with the $CO_2$ permeating through the contents of each container to sparge the air and allow release of $CO_2$ produced through fermentation, the airlock 29 at the end of the array preventing entry of air.

Instead of using gas inlet means dry ice, solid $CO_2$, may be held in an insulating support. The support may be in the form of a polystyrene box 23 which may be provided with means to allow escape of $CO_2$ gas such as perforations or a loose fitting lid. The polystyrene insulates the dry ice and the perforations or loose fitting lid allow gradual release of $CO_2$ gas. The polystyrene-covered dry ice is placed in the base of each container and then hand picked, uncrushed grapes are placed into the container until the container is full. The height of the container is selected so that when full, the weight of the upper grapes does not cause the lower grapes to be crushed, resulting in breaking the skins and causing contact between the juice and the exterior of the skins. The height to which the grapes are placed in the containers depends on the conditions and variety of grape. The containers would contain Shiraz or Carbernet Sauvignon grapes to a maximum depth of about 1½ meters and the depth of Grenache or Tarrango grapes would be limited to about 1 meter.

The polystyrene covering of the dry ice prevents direct contact of the grapes with the dry ice which would cause the skins to freeze and crack. As each container is loaded with grapes the dry ice vapourises to cause a gradual release of $CO_2$ past the berries. Because $CO_2$ is heavier than air the release of the $CO_2$ pushes air upwardly out of the container. Once the container is full of grapes, the overlapping edges of the plastics bag are joined together by heat fusion or some other bonding technique, such as taping, welding or stitching. The air-lock or non-return valve incorporated within the plastics liner ensures release of gases held therein but not entry of air. The size of the block of dry ice together with the perforations in the polystyrene support means or loose fitting closure are carefully selected to ensure a gradual release of vapourised $CO_2$ for at least 15 hours. The gradual release of $CO_2$ results eventually in the removal of substantially all air.

Once the maceration process takes place, caused by the enzymes within each berry, $CO_2$ is released and this can escape via the air-lock. The maceration process is dependent on the temperature, but the actual temperature is not critical. The walls of the container are preferably constructed of thick-walled corrugated cardboard having good thermal insulation to ensure that the temperature within the container is fairly uniform. With a temperature at approximately 28° C. the maceration process takes about five days. For lower temperatures a longer maceration process is required.

When the alcohol level reaches between 2 and 5% alc/vol. the enzymes are denatured and the process stops. To determine the end of the maceration apparatus for measuring alcohol content is placed across the air-lock to determine the alcohol content within the interior of the bag. The sort of apparatus that is envisaged to measure the content of the alcohol would be of the kind used for testing the alcohol content of vehicle drivers. In another embodiment (not shown) crystals of the kind used in a conventional breathaliser kit may be incorporated within the plastic sheet or air-lock, the crystals being arranged to turn into a particular colour only when the alcohol level reaches the desired level at complete fermentation.

Once the maceration is complete the inner sealed bag is opened and the contents are tipped into a destemmer and crushed. The destemmer removes the stems and ensures that the juice hardly ever contacts the stems. The must collected from the destemmer and crusher (or juice, if separate from the skins) is then placed in large vats and selected yeast is added to complete the fermentation. At this stage the sugar level is so low that the temperature is not critical. Therefore, there is very little need for refrigeration of the contents of the large vat to complete the fermentation. Once the secondary fermentation is complete the juice is clarified and then bottled. If desired the whole process from picking the grapes to bottling the wine can be completed within fourteen days.

FIGS. 3 and 4 illustrate one form of plastic bag that may be used to line the containers 10 described above.

A plastic bag 30 of suitable thickness has a mouth 31 that is defined by two opposed surfaces 32, 33 that can be brought into parallel abutting contact to seal the bag. The bag is sealed by the provision of a pair of parallel longitudinal extending tongues 34, 35 on one surface 32 of the bag that are arranged to be a force fit within correspondingly positioned grooves 36, 37 on the other surface 33 of the bag 30. By pressing the two surfaces together, the tongues are forced into sealed engagement in the grooves to thereby provided a sealed enclosure. It is understood that the number and positioning of the tongue and groove seals may vary for particular types of bag.

A form of one-way valve is illustrated in detail in FIG. 4. A rubber teat 42 is pushed through a small hole 40 in the bag surface 41, the test 42 has a projecting end portion 43 and a pair of location flanges 44 and 45. The larger 44 of the location flanges abut against the inside of the plastic material 41 and an annular steel or plastic ring 50 having a central hole 51 is resiliently located between the annular flanges, so that the steel or plastic ring filmly locates the teat against the bag surface where glue may be applied. This arrangement also ensures that the teat is secured to the bag in an air-tight manner. The projecting end of the teat is provided with a small slit or orifice 53 that is arranged to open when the pressure within the bag and teat is greater than the outside pressure. Once the slit is open, the gas within the bag releases to the atmosphere. However, it is understood that virtually no air can enter the bag through the test. If necessry more than one such valve may be incorporated in any bag.

EXAMPLE

In an example of making wine by carbonic maceration, Tarrango grapes were hand-picked at between 11 and 12 degrees Baume. The grapes were placed into oversized plastic-bag liners in 12 sided cardboard containers to a depth of 1 meter. The cardboard containers were approximately 1 cubic meter. Carbon dioxide gas from cylinders sparged the air from the liners, the liners almost sealed and the containers stored in the shade on the site where the grapes were picked. The day-time temperatures ranged between 27° C. and 32° C. and the night-time temperature ranged between 10° and 15° C. The intra-cellular fermentation commenced almost immediately and the alcohol level of the gases escaping from the containers was measured after about 5 days using an alcohol meter. Once the alcohol level was stable, after between 5 and 7 days maceration, the containers were transported to the winery, the sealed liners opened and the contents tipped into a hopper for destemming and crushing. The must was then pumped into a conventional stainless steel fermentation tank of approximately 7,000 liters. (It is however understood that tanks as large as 500,000 liters could be used.) The selected yeast in dry powder form of Saccharomyces species was then added at the rate of 0.001 gm/liter. Tartaric acid was also added to ensure that the pH level was reduced to 3.4. (Some makers may adjust the pH to another value). A lid was then placed on the stainless fermentation tank and the tank contents kept at between 15° C. and 20° C. by refrigeration. The yeast fermentation was conducted for about 4 days until the reducing sugar was less than 2 gm/liter, as measured by chemical analysis. When the reducing sugar was less than 2 gm/liter, the free-run wine was run off, the skins pressed, the pressings and free-run wine blended together and the wine subjected to coarse filtration. The wine was then inoculated with lactic acid bacteria and maintained at a temperature of 15° C. in a tank until the malo-lactic transformation was complete. The $SO_2$ content of the wine was increased by adding $SO_2$ to 15 parts per million free $SO_2$ as measured by the Rankine method. The wine was then refrigerated to −5° C. for cold stabilisation. Once no more tartrate precipitated, the wine was sterile-filtered and bottled. The whole process took approximately 28 days, but 14 days of this process related to the malo-lactic transformation which is not essential.

The use of thick walled collapsible cardboard containers provides a simple, light and cheap means of completing the carbonic maceration process. The containers may be simply transported by use of the pallets and may if necessary be stored several high on top of each other. When not in use, the cardboard boxes can be collapsed for storage. The corrugated thick-walled cardboard provides good insulation to provide moderately steady temperatures during the maceration process. Because the maceration process is caused by the enzymes within the berries and not the yeast on the skins of the berries the process is not dependent on critical temperatures. The process works most efficiently at temperatures of between 28° C. and 32° C., and thus is ideal for the Australian climate where such temperatures are frequently encountered in the grape growing areas. Because yeast, either on the skin of the grapes or selected yeast, is not used in the maceration, the winemaker does not have to worry about excess temperatures detrimentally affecting the yeast and encouraging undesirable bacterial activity. There may therefore be no need for expensive refrigeration equipment. In fact the maceration can take place at the site where the grapes have been picked.

The use of an alcohol meter or the crystals to measure the level of alcohol within the sealed enclosure is an important step in ensuring that the maceration is complete. It is not desirable to use more conventional means such as a hydrometer, because such use would require entry to the sealed enclosure and thus would allow entry of air which might cause oxidation of the berries. It is an important criterion of the carbonic maceration process that the process is anaerobic. It is for this reason that a gas such as $CO_2$ is used to expel air from within the enclosure.

The wine possesses a fruity aromatic complexity and immediate drinkability. There is no need to store the wine in oak prior to bottling. Storing in oak will of course further add to the complexity of the wine and this step can be effected if required.

Another feature of this wine is that excellent drinking wine can be made from unfashionable grape varieties such as Grenache or Shiraz. The grapes may also be blended to suit availability.

Although the process for producing wine by carbonic maceration described above is particularly suited for red wine production a similar process may be used in the production of white wine and Rose.

Having now described my invention, what I claim is:

1. A method of producing wine by full carbonic maceration including the steps of:
   (a) placing whole grapes into a closable container containing sufficient solid $CO_2$ to substantially purge the air therein,
   (b) closing the container to prevent entry of air,
   (c) expelling by vaporization of the solid $CO_2$ the air within the container prior to commencement of carbonic maceration, and
   (d) by continual vaporization of the solid $CO_2$ maintaining a sufficiently low concentration of gaseous oxygen in the container for a time effective to initiate intracellular fermentation, the handling of the grapes, the depth of the grapes in the closable container and the conditions under which the full carbonic maceration is carried out being such as to ensure that more than 85% of the grapes remain whole up to the time that the full carbonic maceration steps (a) to (d) are completed.

2. A method according to claim 1 including after steps (a) to (d) the steps of:
   (e) destemming and crushing some or all of the grapes, and
   (f) fermenting the must or the juice from the crushed grapes,
with yeast.

3. A method according to claim 1 wherein at least 90% of the grapes remain whole up to the time that the full carbonic maceration steps (a) to (d) are completed.

4. A method according to claim 1 wherein at least 95% of the grapes remain whole up to the time that the full carbonic maceration steps (a) to (d) are completed.

5. A method according to claim 1 wherein the depth of the grapes within the closable container is less than 1.75 meters.

6. A method according to claim 1 wherein the depth of the grapes within the closable container is less than 1.25 meters.

7. A method of producing wine according to claim 2 wherein grapes are placed in a plurality of the closable containers, after completion of steps (a) to (f), the must or juice obtained from crushing the grapes from each of the closable containers are combined and placed in one fermenting vat and fermented with yeast.

8. A method according to claim 7 wherein the grapes are picked and placed directly into the closable containers at the vineyard where the grapes are grown, to minimise damage by handling.

9. A method according to claim 8 wherein the closable containers are stored outdoors during the time that the full carbonic maceration takes place.

10. A method according to claim 1 wherein the closable container includes a rigid outer structure which is lined with flexible plastic film.

11. A method according to claim 10 wherein said rigid outer structure includes four or more sidewalls which are collapsible for storage and said rigid outer structure is mounted on a pallet.

12. A method according to claim 1 wherein the solid $CO_2$ is placed inside an insulated support to protect the grapes from contact therewith and to permit a controlled rate of evolution of gaseous $CO_2$ therefrom.

13. A method according to claim 12 wherein sufficient solid $CO_2$ is present in the container to ensure that $CO_2$ is evolved for at least 15 hours and the volume of $CO_2$ evolved is at least twice the capacity of the closable container.

14. A method according to claim 2 wherein a proportion of grapes are crushed during step (e) and the uncrushed grapes are left in with the grape must during fermenting step (f).

15. A method according to claim 10 wherein said rigid outer structure comprises a thick-walled open ended collapsible cardboard box; said flexible plastic film is in the form of an open bag, the open end of the bag overlapping the open end of the cardboard box prior to placement of grapes therein; and the open end of said bag is closed to prevent ingress of air after said bag has been filled with grapes.

16. A method according to claim 15 wherein the walls of said open bag are provided with complementary tongue and groove sealing means which allow the bag to be sealed when the two are pressed together.

17. A method according to claim 1 wherein the completion of the full carbonic maceration is determined by measuring the alcohol content of gas within the closable container.

18. A method according to claim 1 wherein the closable container is provided with a one-way valve arranged to allow venting of $CO_2$ gas generated by the full carbonic maceration.

19. A method of producing wine by carbonic maceration comprising the steps of:
   (a) placing a quantity of solid $CO^2$ into an air-impervious bag having a one-way valve,
   (b) placing whole and uncrushed grapes into the bag in a manner to ensure that the skins of the grapes are not broken,
   (c) sealing the bag,
   (d) expelling the air within the bag via the one-way valve by vaporisation of the solid $CO_2$, and maintaining by further vaporization of the solid $CO_2$ a sufficiently low concentration of gaseous oxygen within the container for a time effective to initiate intra-cellular fermentation.

20. A method of producing wine by full carbonic maceration including the steps of:
   (a) providing a plurality of closable containers at a vineyard, each of said closable containers including a rigid outer box which is lined with an open-ended plastic bag and each bag including a support containing sufficient solid $CO_2$ to substantially purge each bag of oxygen after grapes have been placed therein,
   (b) picking grapes and placing them whole directly into the closable containers at the vineyard, the depth of grapes in each closable container being less than 1.75 meters,
   (c) closing each open-ended bag to prevent entry of air,
   (d) allowing the closed containers to stand for a time sufficient to allow substantial intracellular fermentation of the grapes,
   (e) destemming and crushing the grapes from each container,
   (f) combining the must or juice obtained from the grapes of a plurality of the closable containers in a large fermenting vat, and
   (g) fermenting the must or juice in the vat with yeast, the handling of the grapes, the depth of the grapes in the closable containers and the conditions under which the full carbonic maceration is carried out being such as to ensure that more than 95% of the grapes remain whole up to the time that the full carbonic maceration steps (a) to (d) are completed.

* * * * *